United States Patent [19]

Iyer

[11] Patent Number: 5,179,667
[45] Date of Patent: Jan. 12, 1993

[54] SYNCHRONIZED DRAM CONTROL APPARATUS USING TWO DIFFERENT CLOCK RATES

[75] Inventor: Sanjay Iyer, Stanford, Calif.

[73] Assignee: Silicon Graphics, Inc., Mountain View, Calif.

[21] Appl. No.: 840,654

[22] Filed: Feb. 20, 1992

Related U.S. Application Data

[63] Continuation of Ser. No. 244,755, Sep. 14, 1988.

[51] Int. Cl.5 .............................................. G06F 13/00
[52] U.S. Cl. ..................... 395/275; 364/238.2; 364/238.3; 364/238.4; 364/942.04; 364/DIG. 1; 364/DIG. 2; 364/942.05; 395/550; 395/725
[58] Field of Search ... 364/200 MS File, 900 MS File

[56] References Cited

U.S. PATENT DOCUMENTS

| | | | |
|---|---|---|---|
| 3,750,107 | 7/1973 | Pyne | 364/200 |
| 4,016,541 | 4/1977 | Delagi et al. | 364/200 |
| 4,050,096 | 9/1977 | Bennett et al. | 364/200 |
| 4,095,267 | 6/1978 | Morimoto | 364/200 |
| 4,100,601 | 7/1978 | Kaufman et al. | 364/200 |
| 4,130,864 | 12/1978 | Schlotter | 364/200 |
| 4,164,787 | 8/1979 | Aranguren | 364/200 |
| 4,183,058 | 1/1980 | Taylor | 358/127 |
| 4,195,342 | 3/1980 | Joyce et al. | 364/200 |
| 4,249,247 | 2/1981 | Patel | 364/900 |
| 4,339,804 | 7/1982 | Darison et al. | 364/900 |
| 4,405,983 | 9/1983 | Perez-Mendez | 364/200 |
| 4,473,880 | 9/1984 | Budde et al. | |
| 4,523,274 | 6/1985 | Fukunaga et al. | 364/200 |
| 4,575,826 | 3/1986 | Deam | 365/222 |
| 4,581,721 | 4/1986 | Gunawardana | 365/230 |
| 4,583,167 | 4/1986 | Sääksjärvi et al. | 364/200 |
| 4,649,511 | 3/1987 | Gdula | 364/900 |
| 4,654,804 | 3/1987 | Thaden et al. | 364/200 |
| 4,701,843 | 10/1987 | Cohen | 364/200 |
| 4,787,064 | 11/1988 | Wagner | 364/900 |
| 4,788,640 | 11/1988 | Hansen | 364/200 |
| 4,807,121 | 2/1989 | Halford | 364/200 |
| 4,858,173 | 8/1989 | Stewart et al. | |
| 4,881,195 | 11/1989 | DeLong et al. | |
| 4,928,234 | 5/1990 | Kitamura et al. | 364/200 |
| 4,958,304 | 9/1990 | Moore | 364/521 |
| 4,987,529 | 1/1991 | Craft et al. | |
| 5,021,951 | 6/1991 | Baba | 364/200 |
| 5,097,468 | 3/1992 | Earlie | 371/151 |

OTHER PUBLICATIONS

Intel 8207 Dual-Port Dynamic RAM Controller, Intel Microprocessor and Peripheral Handbook, vol. II (Peripheral), pp. 1-39 to 1-85 (Sep. 1987).

Primary Examiner—Dale M. Shaw
Assistant Examiner—C. Shin
Attorney, Agent, or Firm—Blakely, Sokoloff, Taylor & Zafman

[57] ABSTRACT

A control apparatus for a computer is described that includes an arbiter circuit for selecting a first controller for supplying the memory of the computer with a first plurality of addresses from a first bus at a first rate and for selecting the second controller for supplying the memory of the computer with a second plurality of addresses from a second bus at a second rate. The first and second controllers are selected such that the first and second controllers do not supply the memory with more than one memory address at a time. A method for controlling the use of a computer bus is also described. A plurality of requests to use the bus are received. A length of a first period for use of the bus and a length of a second period for use of the bus are preselected. Each of the plurality of requests are granted.

7 Claims, 4 Drawing Sheets

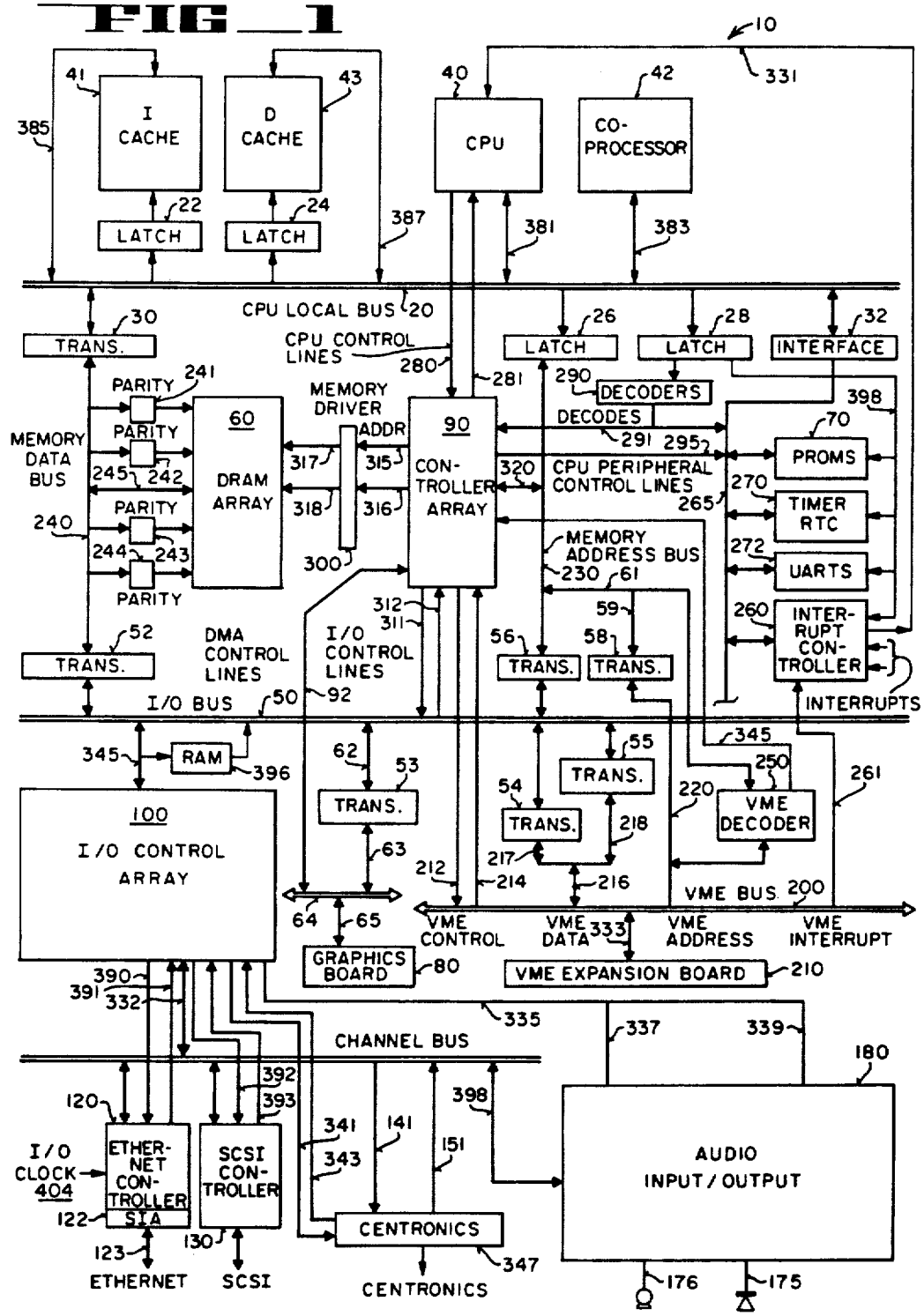
FIG_1

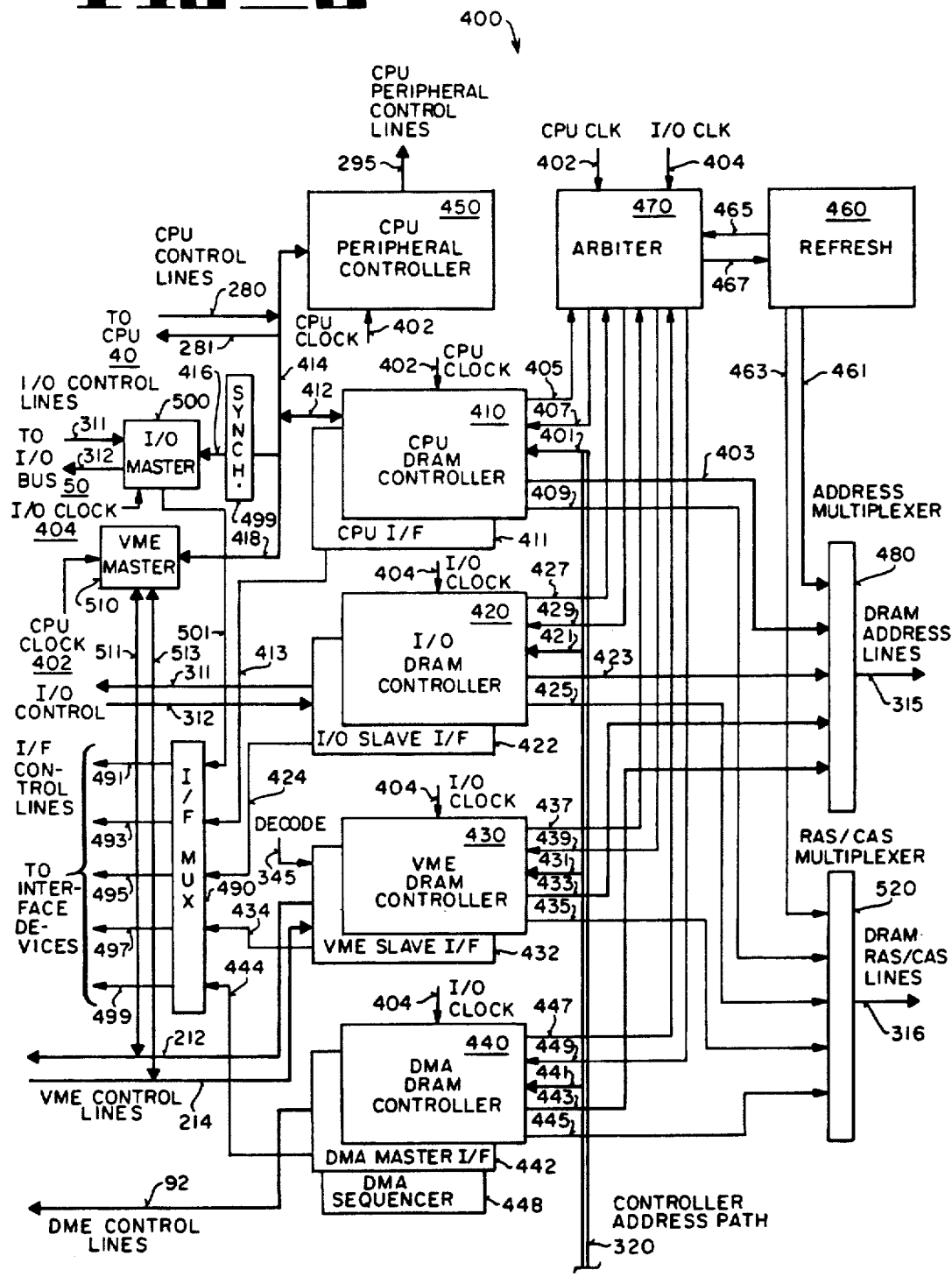

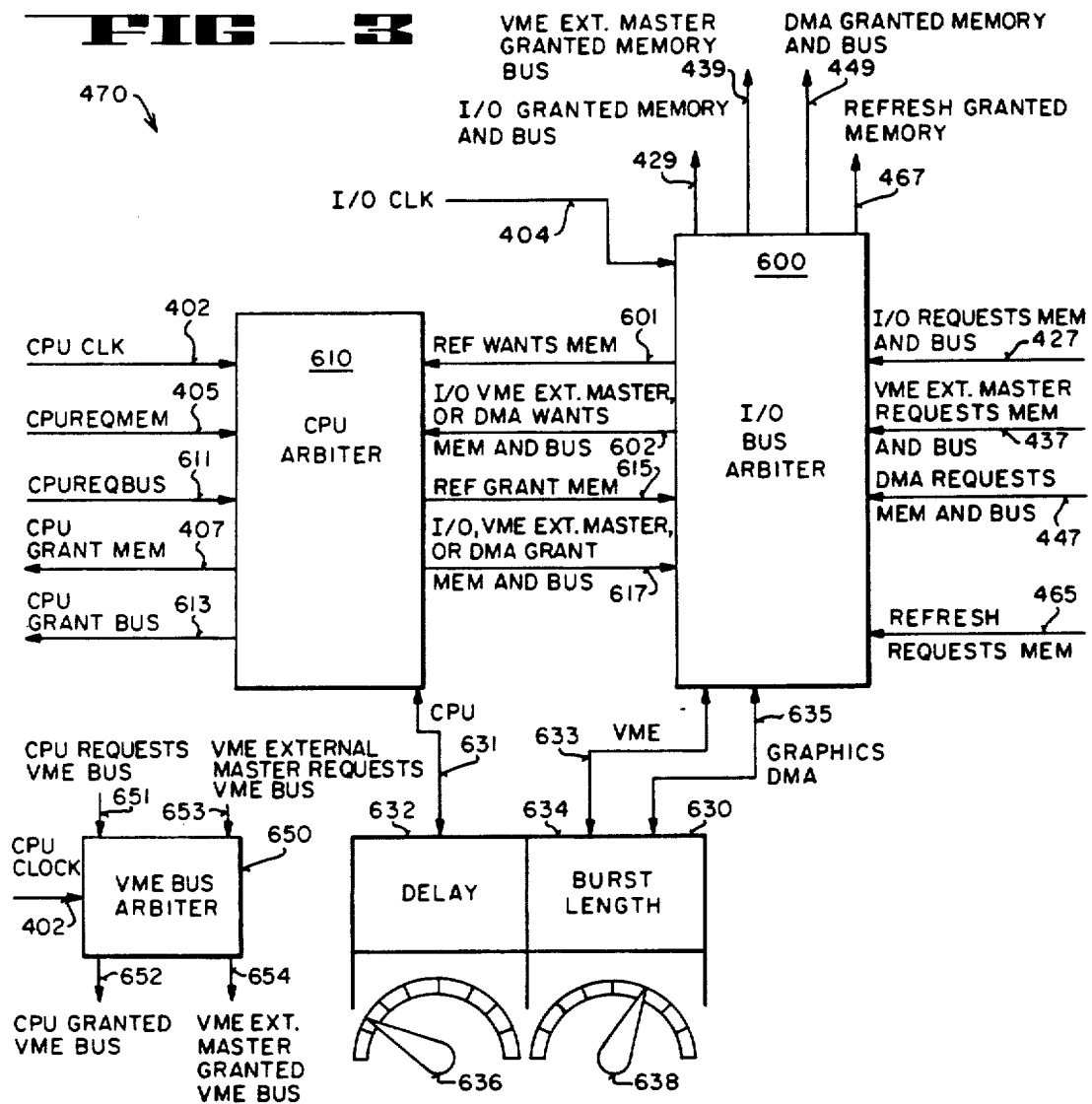
FIG_3
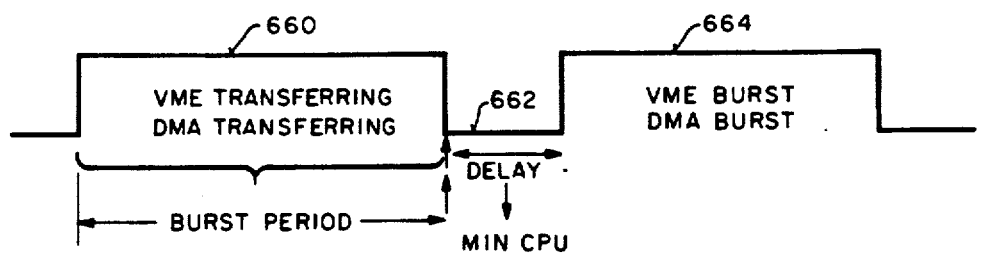
FIG_4

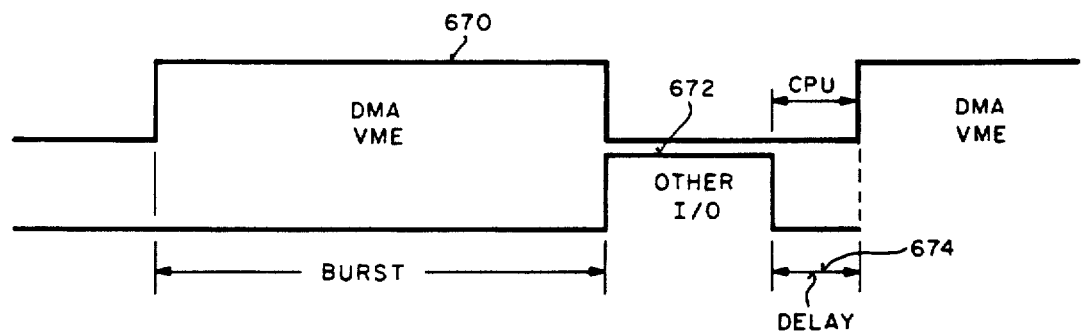
FIG_5
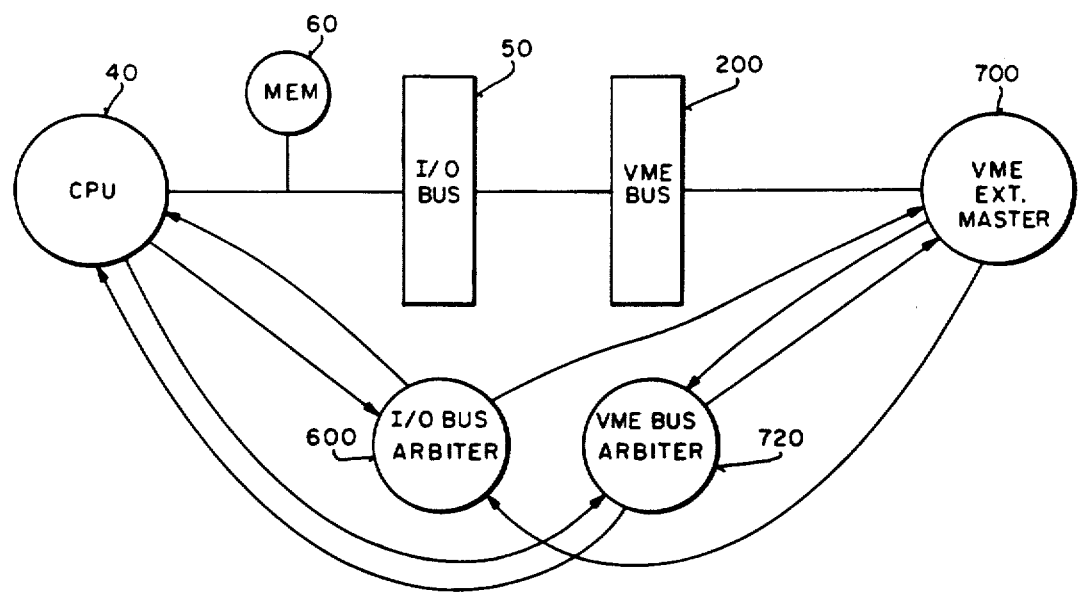
FIG_6

SYNCHRONIZED DRAM CONTROL APPARATUS USING TWO DIFFERENT CLOCK RATES

This is a continuation of application Ser. No. 07/244,755, filed Sep. 14, 1988.

FIELD OF THE INVENTION

The present invention pertains to the field of control logic for a digital computer. More particularly, this invention relates to controlling the transfer of digital information over one or more computer buses and to and from memory.

BACKGROUND OF THE INVENTION

Digital computers have employed control methods and systems for controlling the transfer of digital information between buses and memory and between buses and input/output interfaces.

Computers employing dynamic random access memories ("DRAMs") have used DRAM controllers to provide all the signals necessary to control dynamic memories. DRAM controllers provide, for example, multiplexed addresses and address strobes, refresh logic, and refresh/access arbitration. DRAMs need to be refreshed to avoid loss of data stored in memory.

Computers with two buses have used dual-port DRAM controllers. The Intel Model 8207 Dual-Port DRAM Controller, for example, has a dual-port interface that allows two different buses to independently access memory, and also provides all signals necessary to control certain DRAMs. For both ports of the Model 8207 controller to be operated synchronously the processors used in conjunction with the controller must be the same type (Fast or Slow Cycle) and they must have synchronized clocks. So to run both ports synchronously, the processors must have related timings (both phase and frequency). If these conditions cannot be met, then one port must run synchronous and the other asynchronous.

Operating a prior art DRAM controller asynchronously means that one part of the controller is running at one speed (for example, a slow speed) and the other part is running at a different speed (for example, a fast speed). Operating a prior art DRAM controller asynchronously imposes performance penalties, however. For every handshake involving the controller, the sum of central processing unit ("CPU") synchronizing time and input/output ("I/O") synchronizing time is lost. Said sum of synchronizing times is a relatively large number that is one on the order of a memory access time. Thus, in prior art DRAM controllers, each memory access has associated with it a relatively large amount of time lost in order to achieve synchronization.

Prior art methods of controlling input/output operations for a single bus have also imposed performance limitations. In prior art digital computers, the central processing units ("CPUs") can be slowed down if input/output devices have priority with respect to the use of bus. If the input/output devices do not have priority, then input/output devices can lose data. More networking between computers means more input/output information needs to be processed, which means that CPUs can be slowed down even more. Examples of input/output devices are Ethernet interfaces, disk controllers, and printer interfaces.

SUMMARY AND OBJECTS OF THE INVENTION

In view of the limitations of known control methods and systems, one of the objectives of the present invention is to provide an improved method and apparatus for supplying a memory with a first plurality of memory addresses from a first bus at a first rate and a second plurality of memory addresses from a second bus at a second rate in order to minimize synchronization penalties.

Another objective of the present invention is to provide an improved control method and apparatus for granting each of a plurality of requests to use a bus from a plurality of sources, including a first source, a second source, and a third source.

Another objective of this invention is to provide an improved control apparatus that includes a controller for a central processing unit and a controller for input/output circuitry that includes interface control circuitry, an Ethernet interface, a disk controller, a printer interface, and input/output circuitry for audio recording and playback.

Another objective of the present invention is to provide an improved control method and apparatus wherein when the CPU is accessing memory, the CPU's clock rate governs and when an input/output device is accessing memory, the input/output device's clock rate governs. It is therefore an objective of the present invention to provide a high input/output rate of accessing memory, and providing an increase in performance of the digital computer.

An additional objective of the present invention is to provide a control method and apparatus that facilitates the changes of a CPU without affecting the rest of the system and without decreasing system performance.

It is an additional objective of the present invention to provide an improved control method and apparatus for a digital computer with two or more separate buses running synchronously at different speeds.

A further objective of the present invention is to provide a controller array chip that provides control of memory accesses as well as control over bus allocation times. An objective of the present invention is to provide a controller array that manages different clocks and provides the least performance penalty. An objective of the present invention is to provide a controller array that minimizes synchronization penalties.

A further objective of the present invention is to provide an improved control method and apparatus for providing a means for transferring huge amounts of memory data to a frame buffer.

A further objective of the present invention is to guarantee the CPU time on the bus after an input/output is finished. An additional objective of the present invention is to allow such CPU guarantee time to be preselected from a choice of variable settings.

An additional objective of the present invention is to guarantee the CPU a minimum rate of execution of the CPU's code in the presence of burst mode transfers, input/output transfers, or both.

These and other objects of the invention are provided for by a control apparatus for a computer that includes a memory, a first bus for transferring addresses at a first rate, and a second bus for transferring addresses at a second rate different from the first rate. The control apparatus includes a first controller for supplying the memory with a first plurality of memory addresses from a first bus, the first controller being coupled between the first bus and a multiplexer. The control apparatus also includes a second controller for supplying the memory with a second plurality of memory addresses from the second bus, the second controller being coupled between the second bus and the multiplexer. The control apparatus also includes means for selecting the first controller for supplying the memory with the first plurality of memory addresses from the first bus at the first rate and for selecting the second controller for supplying the memory with the second plurality of memory addresses from the second bus at the second rate. The first and second controllers are selected such that the first and second controllers do not supply the memory with more than one memory address at a time. The first controller can be a controller for a central processing unit, the second controller can be a controller for input/output circuitry, and the selecting means can be a arbiter circuit.

The above-mentioned objects and other objects of the invention are also provided for by a method for controlling, in a computer with a memory, the use of a first bus for transferring addresses at a first rate, and a second bus for transferring addresses at a second rate different from the first rate. The method includess selecting a first controller for supplying the memory with a first plurality of memory addresses from the first bus, and selecting a second controller for supplying the memory with a second plurality of memory addresses from the second bus at the second rate. The first and second controllers are selected such that the first and second controllers do not supply the memory with more than one memory address at a time. Again, the first controller can be a controller for a central processing unit, the second controller can be a controller for input/output circuitry, and the selecting means can be an arbiter circuit.

The above objects and other objects of the invention are also provided for by a method of controlling the use of a computer bus, wherein a plurality of requests to use a bus are received from a plurality of sources, including a first source, a second source, and a third source. A length of a first period for use of the bus and a length of a second period for use of the bus are preselected such that the combined length of the first and second periods is less than a maximum length of time that the third source can tolerate being off the bus. The first source can request a first period of use of the bus that would last for up to the length of the first period. The second source can request a second period use of the bus that would last up to the length of the second period in the presence of requests by the first source and the third source. The third source cna request a use of the bus that would last as long as it would take for the third source to complete a third source operation. Each of the plurality of the requests is granted. The plurality of sources do not use the bus more than one at a time. The first periods occur repetitively if the first source requests more than one first period use of the bus. Second periods occur repetitively if the second source requests more than one second period use of the bus. Periods available for the third source to use bus occur repetitively if the third source requests more than one use of the bus. No other source is granted use of the bus while the first source is using the bus during the first period. No other source is granted use of the bus while the second source is using the bus during the second period. No other source is granted use of the bus while the third source is using the bus. The first source can be a graphics system. The second source can be a central processing unit. The third source can be input/output circuitry. The first period can be a burst mode period. The second period can be a delay period.

The above objects and other objects of the invention are also provided for by an apparatus that provides means for performing the above-described method of controlling the use of a computer bus.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 1 is a block diagram of the architecture of a digital computer that includes a central processing unit ("CPU"), buses, memory, control circuitry, and input/output interfaces;

FIG. 2 is a block diagram of system control logic for the digital computer;

FIG. 3 illustrates an arbiter circuitry with a bus timer;

FIG. 4 illustrates bus timing without input/output signals;

FIG. 5 illustrates bus timing in the presence of input/output signals; and

FIG. 6 is a block diagram showing the connections between CPU, the VME bus arbiter, the VME external master interface, and the I/O bus arbiter.

DETAILED DESCRIPTION

With reference to the drawings, FIG. 1 illustrates in block diagram form circuitry 10 forming the architecture of a digital computer with enhanced graphics capabilities. The computer has two independent buses; central processing unit ("CPU") local bus 20 and input/output ("I/O") bus 50. Buses 20 and 50 are each time multiplexed buses, which means that each bus is a combined address and data bus. CPU local bus 20 is buffered by address latches 22, 24, 26, and 28, data transceiver 30, and interface 32, which is a combination data latch and transceiver.

In the preferred embodiment of the present invention, CPU 40 is an R2000 reduced instruction set computer ("RISC") microprocessor sold by MIPs Computers of Sunnyvale, Calif. CPU 40 drives the CPU local bus 20, which provides an interconnection to instruction cache 41, data cache 43, floating-point coprocessor 45 (which is an R2010 floating-point coprocessor sold by MIPs Computers of Sunnyvale, Calif. Dynamic Access Memory ("DRAM") array 60, and local peripherals, which include programmable read only memories ("PROMs") 70, Timer/Real Time Clock ("RTC") circuit 270, Universal Asynchronous Receiver Transmitter ("UART") 272, and interrupt controller 260.

Controller array 90 contains the interface control logic for controlling the transfer or digital information between the devices and buses or circuitry 10. Controller array 90 thus contains the control logic for the CPU write buffers (such as address latches 22, 24, 26 and 28), the above referenced local peripherals, DRAM array 60, and I/O bus 50. In this sense, controller array 90 is the hub of the digital computer, tying together all the different devices and interfaces. In a preferred embodiment of the present invention, controller array 90 is implemented in a single gate array integrated circuit package.

Controller array 90 is coupled to memory driver 300 which in turn is coupled to DRAM array 60. DRAM addresses are sent from controller array 90 over lines 315 to memory driver 300. Memory driver 300 then sends the DRAMS addresses over lines 317 to DRAM array 360. Row address strobe ("RAS") signals and column address strobe ("CAS") signals for the DRAMs in DRAM array 60 are sent from controller array 90 over lines 316 to memory driver 300. RAS signals and CAS signals are then sent from memory driver 300 over lines 318 to DRAM array 360.

Memory address bus 230 is coupled between address latch 26 and transceiver 56. Memory addresses travel between memory address bus 230 and controller array 90 via controller address path 320.

Memory data bus 240 is coupled between register (data) transceiver 30 and register (data) transceiver 52, and is also coupled to DRAM array 60. Memory data bus 240 is additionally coupled to parity checkers 241, 242, 243, and 244. Parity checkers 241, 242, 243, and 244 check the parity of data being sent to the DRAM array 60 for storage, and thus provide error detection and correction.

Controller array 90 receives control signals from CPU via CPU control line 280. Controller array 90 sends control signals to CPU 40 via CPU control lines 281.

Controller array 90 is coupled to graphics board via direct memory access ("DMA") control lines 92, also called graphics control lines 92. Direct Memory access control lines 92 permit DMA control signals to be sent between controller array 90 and graphics board 80.

Lines 385 couple instruction cache 41 to CPU local bus 20. Lines 387 couple data cache 43 to CPU local bus 20.

CPU local bus 20 is a 12.5/16.67 Mhz bus optimized for high-bandwidth (100/128 Mbytes/second interactions between CPU 40 and cache 41 and 43. CPU local bus 20 is capable of performing two pipelined cache accesses per clock cycle. Accesses to slower devices (i.e., local memory and peripherals) result in stall states produced by the control logic in controller array 90. An interface 32 accepts isolated writes at CPU speeds, but any other memory or peripheral accesses that are attempted before the buffered write completes are stalled until the write completes. This embodiment preserves the order of actual execution of reads and writes.

I/O bus 50 connects the I/O devices (including printer interface 347, disk drive controller 130, graphics board 80,and Ethernet controller 120) and a VME expansion board 210 to memory 60 through a second port of memory 60 via data transceiver 52, memory data bus 240, and lines 245. The second port also gives CPU 40 access to I/O bus-resident devices, such as printer interface 347, disk drive controller 130, and Ethernet controller 120. I/O bus 50 is connected to data transceiver 52, graphics transceiver 53, VME data transceivers 54 and 55, address transceiver 56, address transceiver 58, and input/output control array 100. I/O bus 50 is a 10 Mhz multiplexed synchronous bus. I/O bus 50 has a burst mode of operation providing a peak bandwidth of 40 Mbytes/second, specially targeted to supporting fast pixel moves to an from a frame buffer (not shown) in graphics board 80.

I/O control lines 311 and 312 allow I/O control signals to be sent between controller array 90 and I/O bus 50.

I/O control array 100 couples channel bus 110 to I/O bus 50. Channel bus 110 has a 16 bit data path hooked to Ethernet controller 120, SCSI disk controller 130, printer interface 347, and audio input/output circuitry 180 Control lines 390 and 391 couple I/O control array 100 to Ethernet controller 120. Control lines 392 and 393 couple I/O control array 100 to SCSI controller 130. Control lines 341 and 343 couple I/O control array 100 to Centronics printer interface 347.

Ethernet controller 120 provides an interface for communication to and from other computers and peripherals that reside on a coaxial cable network with the present digital computer. In a preferred embodiment of the preferred invention, Ethernet controller is an AMD7990 controller, sold by Advanced Micro Devices of Sunnyvale, Calif. Ethernet controller 120 includes an on-board first-in first-out ("FIFO") memory that is 48 bytes deep I/O clock 404 is coupled to Ethernet controller 120 so that Ethernet controller 120 will run synchronously with respect to I/O bus 50, in order to avoid performance penalties.

Serial interface adapter ("SIA") 122 converts digital signals from Ethernet controller 120 to analog signals that can be transmitted over an Ethernet coaxial cable 123, and also converts analog signals from cable 123 to digital signals that are sent to Ethernet controller 120. In a preferred embodiment of the present invention, SIA 122 is an AMD7992 SIA sold by Advanced Micro Devices.

Channel bus 110 is also coupled to a SCSI disk controller 130. In a preferred embodiment of the present invention,-disk controller 130 comprises a WD33C93 chip sold by Western Digital Corporation of Irvine, Calif. Disk controller 130 is, in turn, connected to a external disk drive (not shown).

Channel bus 110 is coupled to Centronics printer interface 347. Data path 141 is an output to Centronics printer interface 347, and data path 151 is an input from Centronics printer interface 347. Centronics printer interface 347 is in turn coupled to a Centronics connector.

Channel bus 110 is also coupled to audio input/output circuitry 180 via lines 398. Audio input/output circuitry 180 is also coupled to I/O control array 100 via lines 335, 337 and 339. Audio circuitry 180 is capable of recording any sounds within a certain bandwidth. Audio circuitry 180 can also generate tones within a certain bandwidth. Audio signals going to speaker 175 from audio input/output circuitry 180 are in analog form. Audio signals going from microphone 176 to audio input/output circuitry 180 are also in analog form.

Chip-select signals, direct memory access ("DMA") handshake signals, and slave address lines are driven by the I/O controller array 100 with no additional glue logic required. In a preferred embodiment, I/O controller array 100 is implemented in a single gate array chip.

The printer interrupt is generated by I/O control array 100. The SCSI and Ethernet interrupts are generated directly by the corresponding controllers 120 and 131. A single static random access memory ("RAM") 396 coupled between lines 345 and I/O bus 50 provides the map for all channels of channel bus 110. The Ethernet, SCSI, and audio channels are assigned 256 locations each.

VME expansion board 210 is coupled to VME bus 200. Examples of VME expansion boards include a modem, a serial interface card that provides additional serial ports, a circuit board that supports an image scanner, a circuit board that supports a plotter, a circuit board that supports a printer, and a gateway board that provides another Ethernet interface. In a preferred embodiment of the present invention, circuitry 10 contains a single VME expansion slot 333 into which one of several types of VME expansion boards is plugged. VME expansion slot 333 is coupled to VME bus 200.

VME bus 200 is a multiplexed bus capable of carrying VME control signals, VME data, VME addresses, and VME interrupt signals.

VME bus 200 is coupled to controller array 90 via VME control lines 212 and 214, VME bus 200 is also coupled to transceivers 54 and 55 via VME data lines 216, 217, and 218. VME bus 200 is also coupled to address transceiver 58 via VME address bus 220.

VME address bus 220 is coupled to VME decoder 250. VME decoder 250 is coupled to memory address bus 230. VME decoder 250 decodes the high order address lines of the memory address bus 230 in order to obtain address modifiers. VME decoder 250 also decodes incoming VME address modifiers in order to decide whether or not to activate VME slave controller 422, described below in connection with FIG. 2. Slave select lines 345 couple VME decoder 250 with VME slave controller 432, which is part of controller array 90 and shown in FIG. 2.

Decoders 290 receive addresses from CPU 40 via transceiver 28. Decoders 290 decide which device CPU 40 wishes to read from or write to. Decoders 290 then send decode signals on chip select lines 291 which serve to enable the device or devices selected by the CPU. Each device to be selected has its own chip select.

CPU peripheral control lines 295 provide control signals, such as read and write signals from CPU 40, for PROMs 70, timer RTC circuitry 270, UART circuitry 272, and interrupt controller 260. Thus, control lines 295 provide control signals for peripheral devices including a keyboard (not shown) and a mouse (not shown) coupled to UART circuitry 272.

Interrupt controller 260 also receives interrupt request from local input/output sources including the graphics board 80, input/output control array 100, Ethernet interface 120, SCSI disk controller 130, Centronics printer interface 347, UART 272, and timer/RTC 270. Interrupt controller 260 also receives interrupts from VME expansion board 210. Accordingly, VME bus 200 is coupled to interrupt controller 260 via VME interrupt lines 261. When interrupt controller receives one or more interrupt requests, interrupt controller 260 sends a signal on line 331 to CPU 40 that indicates that an interrupt request has been received. Interrupt controller 260 also multiplexes the VME and local input/output interrupt signals that it receives and provides an interrupt output signal on lines 265 that indicates which devices have generated interrupts. CPU 40 checks lines 265 to see which devices have generated interrupts. In a preferred embodiment of the present invention, interrupt controller 260 is implemented in a gate array chip.

Lines 265 are a collection of (1) data lines from interface 32, (2) CPU peripheral control lines 295 for communicating read and write signals, and (3) chip select lines 291 from decoders 290. Within lines 265, the data lines from interface 32 run in parallel with CPU peripheral control lines 295 and are not multiplexed. Within lines 265, chip select lines 291 are individual lines connected to PROMs 70, timer/RTC 270, UART 272, and interrupt controller 260, respectively.

Lines 265 are coupled to PROMs 70, timer/RTC circuitry 270, and UART circuitry 272. PROMs 70 are boot PROMs and they provide the software for CPU 40 when CPU 40 boots up. Timer/real time clock circuitry 260 provides the digital computer with a watchdog timer, a system timer, and a real time clock. UART circuitry 272 provides circuitry for communicating via serial ports with a keyboard, a mouse, and other devices (not shown). Address lines 398 are coupled between address latch 28 and PROMs 70, timer/RTC 270, UART circuitry 272, and interrupt controller 260.

FIG. 2 illustrates system controller circuitry 400 for the digital computer. System controller circuitry 400 is part of controller array 90, shown in FIG. 1. System controller 400 includes four distinct DRAM memory controllers—namely, CPU DRAM controller 410, I/O DRAM controller 420, VME DRAM controller 430, and DMA DRAM controller 440. The present digital computer has a dual-clock architecture. There is a relatively fast CPU clock 402 and a relatively slow I/O clock 404. In a preferred embodiment of the present invention, the digital computer switches DRAM controllers, rather than switching clocks, in order to achieve system synchronization.

The system controller 400 also includes CPU peripheral controller 450, I/O master controller 500, and VME master controller 510.

CPU DRAM controller 410, I/O DRAM controller 420, VME DRAM controller 430, and the DMA DRAM controller 440 comprise the memory controller for system 400. The memory controller avoids resynchronization delays for I/O bus accesses by running the DRAM clock (RAS, CAS) off I/O bus clock 404 for I/O bus accesses, and off CPU clock 402 for CPU accesses. There is a synchronization penalty when the DRAM memory changes hands from the CPU 40 master to an I/O master, but once the arbitration is complete, the memory accesses are synchronous, making high bandwidth transfers, such as a burst mode transfer, possible. In other words, there is a synchronization delay when there is a transition from a period in which CPU clock 402 governs memory accesses, such as during a delay period (discussed below) during which CPU 40 controls memory 60, to a period in which I/O clock 404 governs memory accesses, such as during a DMA burst mode period, a VME burst mode period, or an I/O period (all discussed below). There is not a synchronization delay, however, between successive memory accesses as long as those memory accesses are governed by the same clock.

CPU clock 402 is coupled to CPU DRAM controller 410, CPU peripheral controller 450, and VME master controller 510. I/O clock 404 is coupled to I/O DRAM controller 420, VME DRAM controller 430, and DMA DRAM controller 440.

Each of controllers 410, 420, 430, and 440, together with refresh circuitry 460 and arbiter circuitry 470, provide all the signals necessary to control the DRAMs in DRAM array 60 of FIG. 1. Thus, controllers 410, 420, 430, and 440, refresh circuitry 460, and arbiter circuitry 470 provide multiplexed addresses and address strobes, refresh logic, and refresh/access arbitration.

CPU DRAM controller circuitry 410 allows CPU 40 to access either DRAM array 60, I/O bus 50, or both DRAM array 60 and I/O bus 50.

I/O DRAM controller 420 allows I/O devices to access both the I/O bus 50 and DRAM array 60 at the same time. I/O devices include a printer (not shown) communicating through Centronics interface 347 of FIG. 1, a disk drive (not shown) communicating through SCSI interface 130 of FIG. 1, and other computers and peripherals (not shown) communicating through Ethernet interface 120 of FIG. 1.

VME DRAM controller 430 allows VME expansion board 210 of FIG. 1 to access both I/O bus 50 and DRAM memory array 60 at the same time.

DMA DRAM controller 440 allows DMA operations to occur between graphics board 80 and DRAM array 60. During such DMA operations, data passes over I/O bus 50 and is either stored in DRAM array 60 or retrieved from DRAM array 60.

CPU DRAM controller 410 receives DRAM addresses on line 401 from controller address path 320, which is coupled to memory address bus 230 shown in FIG. 1 CPU DRAM controller 410 sends out DRAM addresses on line 403, which goes to address multiplexer 480. Address multiplexer 480 in turn sends out DRAM addresses to DRAM array 60 on DRAM address lines 315. CPU DRAM controller 410 sends out memory and bus requests on lines 405, which connect CPU DRAM controller 410 with arbiter circuitry 470. CPU DRAM controller 410 receives signals granting the CPU the memory and the I/O bus requests on lines 407 which connect arbiter circuit 470 with CPU DRAM controller 410. CPU DRAM controller 410 receives addresses from CPU local bus 20 via address latch 26, memory address bus 230, and controller address path 320.

CPU DRAM controller 410 also sends out RAS and CAS signals to DRAM array 60 via lines 409, RAS/CAS multiplexer 520, and RAS/CAS lines 316.

Arbiter circuit 470 provides memory and bus arbitration. Arbiter circuit 470 decides which of controllers 410, 420, 430, and 440 should be engaged. Arbiter circuitry 470 receives requests to access DRAM array 60 and I/O bus 50, and arbiter circuitry 470 decides which requests should be granted. Arbiter circuit 470 receives "request" signals and sends out "grant" signals. Arbiter circuitry 470 is comprised of flip flops, state machines, gate machines, and programmable logic arrays ("PLAs"). As discussed in more detail below, arbiter 470 enforces a priority and timing scheme for handling simultaneous requests to access DRAM array 60 and I/O bus 50.

CPU DRAM controller 410 includes CPU interface ("I/F") circuitry 411 for generating interface control signals. CPU interface controller 411 is an integral part of CPU DRAM controller 410, and is connected to CPU clock 402. CPU interface controller 411 provides interface signals that help control the flow of data and addresses during bus transfers. For example, CPU interface controller 411 sends enable signals to address latch 26, interface 32, and transceiver 30 of FIG. 1. CPU interface controller 411 sends out interface signals on lines 413, and thus the CPU interface signals first are applied to interface multiplexer 490. Interface multiplexer 490 then sends out interface control signals on interface control lines 491, 493, 495, 497, and 499.

CPU DRAM controller 410 also sends out and receives CPU control signals on lines 412. CPU control signals control various bus transfers involving CPU 40.

Examples of CPU control signals include read/write signals and stall signals, also known as wait signals.

Input/output master controller 500 can send control signals, such as address strobe and data strobe, on I/O control lines 311 to I/O bus 50. I/O master controller 500 can receive control signals, such as acknowledge signals, an I/O control lines 312 from I/O bus 50.

I/O master controller 500 also generates interface signals that are sent to interface devices, such as transceivers, via lines 501, interface multiplexer 490, and interface control lines 491, 493, 495, 497, and 499.

CPU peripheral controller 450 sends "start I/O" signals to I/O master 500 via lines 414, synchronizer 499, and lines 416. I/O master 500 sends acknowledge signals to CPU peripheral control 450 via lines 414. Synchronizer 499 provides an interface between the CPU clock and the I/O clock. There is a synchronization delay for each synchronization performed.

The CPU peripheral controller 450 generates stall signals on behalf of I/O master 500. The stall signals are sent from CPU peripheral controller 450 to CPU 40 via lines 414 and 281.

CPU DRAM controller 410 can also send a signal to CPU peripheral controller 450 via lines 412 and 414 for CPU peripheral controller to send a stall signal to CPU 40. The CPU peripheral control signals control the various CPU peripherals, including PROMs 70, timer/RTC 270, UART circuitry 272, and interrupt controller 260, all shown in FIG. 1. CPU DRAM controller 410 also receives control signals from CPU peripheral controller 450 via lines 414 and 412.

I/O DRAM controller 420 is a memory controller for the various input/output devices. I/O DRAM controller 420 gets its DRAM addresses via I/O bus 50, transceiver 56, memory address bus 230, and controller address path 320.

I/O DRAM controller 420 sends out addresses on lines 423 to address multiplexer 480, which in turn sends out DRAM addresses on DRAM address lines 315.

I/O DRAM controller 420 sends out RAS and CAS signals to DRAM array 60 via lines 425 to RAS/CAS multiplexer 520. RAS/CAS multiplexer 520 sends out RAS and CAS signals to DRAM array 60 via DRAM RAS/CAS lines 316. I/O DRAM controller 420 sends I/O requests for the I/O bus 50 and DRAM controller 60 to arbiter 470 via lines 427. Arbiter 470 sends signals granting the I/O request to use I/O bus 50 and DRAM array 60 via lines 429 to I/O DRAM controller 420.

I/O DRAM controller 420 also includes I/O slave interface controller 422. I/O interface controller 422 provides interface signals for controlling the transfer of data to and from the buses. Examples of interface signals include signals that enable transceivers 52, 56, 58, 53, 54, and 55. The I/O interface signals are sent from I/O interface controller 422 to interface multiplexer 490 via lines 424.

I/O slave interface controller 422 receives I/O control signals on lines 312. Such I/O control signals can include address strobe and data strobe. I/O slave interface 422 sends I/O control signals, such as wait and acknowledge signals, on lines 311.

VME DRAM controller 430 receives an initial memory address from VME address bus 220 (see FIG. 1) via transceiver 58, lines 59 and 61 (see FIG. 1), memory address bus 230, controller address path 320, and lines 431. After VME DRAM controller 430 receives an initial address, it generates its own subsequent addresses internally, within controller 430. VME DRAM controller 430 sends out addresses on lines 433 to address multiplexer 480, to be then sent to DRAM array 60 via DRAM address lines 315. VME DRAM controller 430 sends RAS/CAS signals on lines 435 to RAS/CAS multiplexer 520, to be sent to DRAM array 60 via DRAM RAS/CAS lines 316.

VME DRAM controller 430 also sends VME request to access I/O bus 50 and DRAM array 60 to arbiter 470 via lines 437. Arbiter 470 sends grant signals to the VME DRAM controller 430 via lines 439 for VME expansion board 210 (See FIG. 1) to access I/O bus 50 and DRAM array 60.

VME DRAM controller 430 also includes VME slave interface controller 432, which generates interface signals for controlling the transfer of data and addresses. VME slave interface 432 is coupled to I/O bus clock 404. VME slave interface signals include chip enable signals VME slave interface controller 432 sends VME interface signals to interface multiplexer 490 via lines 434.

VME slave controller 430 receives address and data strobe control signals on VME control lines 214. VME slave controller 430 sends a "Dtak" acknowledge control signal on VME control lines 212 as part of a handshaking scheme.

DMA DRAM controller 440 is initially loaded with an initial memory address via lines 245, memory data bus 240, transceiver 52, I/O bus 50, transceiver 56, memory address bus 230, controller address path 320, and lines 441. DMA sequencer 448, which is part of DMA DRAM controller 440, controls the DMA operation. At that initial address in memory is data that indicates address, count, direction, and end of list information for the DMA operation. DMA sequencer 448 steps through the list in memory of address/count pairs. DMA sequencer 448 also understands when the end of the address/count pairs has been reached. DMA sequencer 448 is coupled to I/O clock 404.

DMA DRAM controller 440 sends addresses to DRAM array 60 via lines 443, which connect DMA DRAM controller 440 with address multiplexer 480. Address multiplexer 480 then sends DRAM addresses to DRAM array 60 via DRAM address lines 315.

DMA DRAM controller 440 sends DRAM RAS/CAS signals to RAS/CAS multiplexer 520 via lines 445. RAS/CAS multiplexer 520 then supplies DRAM array 60 with RAS/CAS signals via DRAM RAS/CAS lines 316.

DMA DRAM controller 440 sends DMA requests to access I/O bus 50 and DRAM array 60 to arbiter 470 via request lines 447. Signals granting DMA request to access I/O bus 50 and DRAM array 60 are sent from arbiter 470 to DMA DRAM controller 440 via lines 449.

DMA DRAM controller also includes DMA master interface controller 442. DMA master interface controller 442 is coupled to I/O clock 404. DMA interface controller 442 generates interface signals for controlling the transfer of data and addresses over the buses of the digital computer. DMA interface signals include chip enable signals for transceivers 52, 56, and 53. DMA interface control signals are sent from DMA interface controller 442 to interface multiplexer 490 via lines 444. Interface multiplexer 490 then supplies the interface control signals to the above referenced transceivers via interface control lines 491, 493, 495, 497, and 499.

DMA master interface controller 442 also generates DMA control signals for controlling I/O bus 50 transfers. DMA master interface controller 442 sends and receives DMA control signals on DMA control lines 92. DMA control lines 92 are in turn coupled to graphics board 80 (See FIG. 1). DMA control signals sent by DMA interface controller 442 can include address strobe and data strobe signals for handshaking on the I/O bus 50. Another example of a control is a delay signal which DMA DRAM controller 440 waits to receive from a slave device in a handshaking scheme. Control signals are part of the bus definition that controls the flow of data across the bus.

When a DMA operation begins and DMA controller 440 is engaged, data stored in DRAM array 60 is transferred to raster memory (not shown) in graphics board 80 via lines 245, memory data bus 240, transceiver 52, I/O bus 50, lines 62, transceiver 53, and lines 63, 64, and 65. On graphics board 80, raster memory (not shown) is implemented as video random access memory (video "RAM") The goal of the direct memory access operation is to transfer huge amount of memory to a frame buffer, which is part of the raster memory on the graphics board 80. Graphics board 80 is part of a graphics system or subsystem of the digital computer. The graphics subsystem, including graphics board 80, handles the transforming, rendering, and displaying of graphical information. These operations are performed locally within the graphic subsystem through the use of a pipelined VLSI raster processor, raster memory, and a microprogrammable engine.

The DMA operation allows the automatic collection of portions of memory and the automatic transferring of that collected portion of memory to the graphics system. CPU 40 first creates a pattern in DRAM array 60. During a DRAM operation, that data is transferred from DRAM array 60 to the raster memory of graphics board 80. In a preferred embodiment of the present invention, the peak sustained rate of transfer is 10 million pixels per second and one word can be transferred every 100 nanoseconds.

DMA DRAM controller 440 can also do a scatter-gather operation.

The graphics DMA operation is a memory to memory transfer operation, and therefore the DMA operation has no discipline. During a DMA operation, huge amounts of data are transferred Therefore, a DMA operation can theoretically tie up the I/O bus for a long period of time, if it were not for arbiter circuitry 470.

Refresh circuitry 460 provides DRAM array 60 with refresh address signals via lines 461 connecting refresh circuitry 460 with address multiplexer 480. Address multiplexer 480 then applies DRAM address to DRAM array 60 via DRAM address lines 315. Refresh circuitry 460 also provides DRAM array 60 with RAS/CAS signals. Refresh circuitry 460 sends its signals to RAS/CAS multiplexer 520 via lines 463.

RAS/CAS multiplexer 520 in turn applies RAS/CAS signals to DRAM array 60 via DRAM RAS/CAS lines 316. Refresh circuitry 460 sends a refresh request memory signal via lines 465 to arbiter circuitry 470. Refresh circuitry 460 receives a refresh granted memory signal from arbiter circuitry 470 via lines 467. To avoid losing data, the DRAMs, in DRAM array 60 should be refreshed no less frequently than once every millisecond. The refresh cycle is implemented as a burst during which DRAM array 60 is accessed sequentially four times with the row address being incremented after each access. In a preferred embodiment of the present invention, the entire burst lasts 1.6 microseconds, with 64 microseconds between bursts.

FIG. 3 illustrates arbiter circuitry 470 in more detail. Arbiter 470 has a two-level structure to parallel the dual-clock architecture of the digital computer. Arbiter 470 includes I/O bus arbiter 600 which provides bus arbitration for I/O bus 50. I/O bus arbiter 600 is comprised of flip-flops, state machines, logic gates, and PLAs. I/O bus arbiter 600 receives I/O requests for memory and the I/O bus 50 on lines 427 from I/O DRAM controller 420. I/O bus arbiter 600 receives VME external master request for the memory and the I/O bus on lines 437 from VME controller 430. VME external master 700 is shown in FIG. 6. VME external master 700 resides on VME expansion board 210 (see FIG. 1) and is described in more detail below. I/O bus arbiter 600 receives VME request for memory and I/O bus 50 on lines 447 from DMA DRAM controller 440. I/O bus arbiter 600 receives refresh requests from memory on lines 465 from refresh circuitry 460.

The I/O request, the VME request, the DMA request, and the refresh request are passed through I/O bus arbiter 600. I/O bus arbiter 600 runs off I/O clock 404. I/O bus arbiter 600 generates a unified request that is sent to CPU arbiter 610. I/O bus arbiter 600 simply performs logical OR operations on the I/O request, the VME request, the DMA request, and the refresh request. The logical OR operations performed by I/O bus arbiter 600 are, of course, performed with logic gates implemented in circuitry.

It should be noted that the I/O, VME, and DMA requests are requests for use of the I/O bus 50 and DRAM array 60 (i.e. memory) at the same time because during an I/O, VME, or DMA operation, data is transferred over I/O bus 50 to and from DRAM array 60. In contrast, refresh circuitry 460 simply requests memory (i.e., DRAM array 60) and not I/O bus 50. This is so because refresh circuitry 460 is simply refreshing the DRAMs in DRAM array 60, and is not transferring any data over I/O bus 50.

When refresh circuitry is accessing memory (i.e., DRAM array 60), there cannot be a simultaneous access of memory by CPU 40, an I/O device, VME expansion board 210, or a DMA operation. In other words, a refresh operation is exclusive with respect to other memory access operations. CPU 40 can access I/O bus 50, however, without accessing memory. In other words, CPU 40 can access other devices beside DRAM array 60 without accessing DRAM array 60 at the same time. For example, CPU 40 can access I/O devices, and the CPU peripherals, such as UART 272 and timer/RTC 270, without accessing DRAM array 60.

Refresh circuitry 460 only requests a memory access and not an I/O bus 50 access, and I/O, VME and DMA request both memory and I/O bus 50 concurrently. Therefore, I/O bus arbiter 600 splits the refresh request for memory from the I/O, VME, and DMA request for memory and I/O bus 50. Thus, I/O bus arbiter 600 sends a signal to CPU arbiter 610 on lines 601 that refresh wants to access memory (i.e., DRAM array 60). I/O bus arbiter 600 sends a signal to CPU arbiter 610 on lines 602 that either I/O, VME external master, or DMA wants to access both memory and I/O bus 50. Again, I/O bus arbiter 600 merely performs a logical OR operation on the various requests and provides outputs on lines 601 and lines 602.

CPU clock 402 drives CPU arbiter 610. CPU arbiter 610 thus runs synchronously to CPU 40. This minimizes CPU latency.

In addition to receiving refresh requests on lines 601 and requests on lines 602 that I/O, VME, or DMA wants memory and I/O bus 50, CPU arbiter 610 also receives requests on line 405 from CPU 40 that CPU 40 requests access to memory (i.e., DRAM array 60). In addition, on lines 611, CPU arbiter 610 receives requests from CPU 40 that CPU 40 requests access to I/O bus 50.

CPU arbiter 610 is made up of flip-flops, state machines, logic gates, and programmable logic arrays ("PLAs"). CPU arbiter 610 performs priority arbitration.

CPU arbiter receives a request on lines 405 from CPU controller 410 (see FIG. 3) for CPU 40 to access memory (i.e. DRAM array 60). CPU arbiter 610 also receives on lines 611 requests from CPU 40 to access I/O bus 50.

On lines 407, CPU arbiter 610 sends out a signal to CPU DRAM controller 410 that CPU 40 is granted access to memory (i.e. access to DRAM array 60). On lines 613, CPU arbiter 610 sends a signal to CPU 40 that indicates that CPU 40 has been granted access to I/O bus 50.

On lines 615, CPU arbiter 610 sends a signal to I/O bus arbiter 600 that indicates that refresh circuitry 460 has been granted access to memory (i.e. access to DRAM array 60). On lines 617, CPU arbiter 610 sends a signal to I/O bus arbiter 600 that indicates that either that I/O, VME, or DMA has been granted access to memory array 60 and I/O bus 50.

CPU arbiter 610 allows sufficient time between turning off a grant to I/O bus arbiter 600 and turning on a CPU grant. This allows synchronization of the I/O grant de-assertion to the I/O bus clock 404.

As discussed above, CPU arbiter 610 can send out a CPU granted bus signal on lines 613 at the same time it sends a refresh granted memory signal out on lines 615. The reason for this is that CPU 40 can access I/O bus 50 without accessing memory array 60. Thus, refresh circuitry 460 can access DRAM array 60 at the same time. However, CPU arbiter 610 cannot send out a CPU granted memory signal on lines 407 at the same it sends out either a refresh granted memory signal on lines 615 or an I/O, VME, or DMA granted memory or bus signal on lines 617. This is because memory accesses cannot happen simultaneously. This also means that CPU arbiter 610 cannot send out a refresh granted memory signal on lines 615 at the same time it sends out an I/O, VME, or DMA granted memory and bus signal on lines 617.

I/O bus arbiter 600 receives the refresh granted memory signal on lines 615 and the I/O, VME, or DMA granting memory and bus signal on lines 617 I/O bus arbiter 600 then provides one of the following outputs: either an I/O granted memory and I/O bus signal on lines 429, a VME external master granted memory and I/O bus signal on lines 439, a DMA granted memory and I/O bus signal on lines 449, or a refresh granted memory signal on lines 467. The I/O granted memory and bus signal on lines 429 is sent to I/O DRAM controller 420 from I/O bus arbiter 600. The VME external master granted memory and I/O bus signal on lines 439 is sent from I/O bus arbiter 600 to VME controller 430. The DMA granted memory and bus on lines 449 is sent from I/O bus arbiter 600 to DMA controller 440. The refresh granted memory signal on lines 467 is sent from I/O bus arbiter 600 to refresh circuitry 460.

I/O bus arbiter 600 and CPU arbiter 610 are governed by a priority and timing scheme, discussed below, with respect to the granting of memory or I/O bus requests by CPU 40, refresh, I/O VME, or DMA. Priority rules determine which of such requests have priority. Bus timer circuitry 630, which is part of arbiter 470, governs the timing of bus arbitration. Bus timer circuitry 630 is connected to CPU arbiter 610 via lines 631. Bus timer circuitry 630 is connected to I/O arbiter 600 via lines 633 and 635.

VME bus arbiter 650 is also included as part of arbiter 470. VME bus arbiter 650 receives the CPU clock on lines 402. VME bus arbiter 650 receives CPU requests for the VME bus 200 on lines 651. VME bus arbiter 650 receives VME external master request to access VME bus 200 on lines 653. VME bus arbiter 650 sends out signals granting the CPU 40 VME 200 on lines 652. VME bus arbiter 650 sends out signals granting the VME external master the VME bus 200 on lines 654. The VME bus arbiter is discussed in more detail below with respect to FIG. 6.

I/O bus arbiter 600 and CPU arbiter 610 orchestrate operation of CPU DRAM controller 410, I/O DRAM controller 420, VME DRAM controller 430, and DMA DRAM controller 440. I/O bus arbiter 600 and CPU arbiter 610 enforce a discipline that prevents any one interface—i.e., CPU, I/O, VME, or DMA—from tying up the I/O bus 50 for more than a certain amount of time. Such discipline is necessary because Ethernet controller 120 (See FIG. 1) has only a small latency tolerance. "Latency" is the time that elapses between a request for memory access and a granting of a request for memory. Ethernet controller chip 120 contains only a 48 byte buffer memory. That buffer memory fills up relatively quickly, due to its small size, when digital information is passing through Ethernet controller 120. Ethernet controller 120 is therefore a latency intolerant device, given that Ethernet controller 120 would lose data if there is too long of a delay between the time Ethernet controller 120 requests a memory access and the time such a request is granted. Moreover, the graphics DMA operation, discussed above, has no discipline. The graphics DMA operation is a memory to memory transfer that moves huge amounts of data. The graphics DMA operation therefore can tie up the I/O bus 50 for relatively long periods of time.

In the present digital computer, DMA transfers to graphics board 80 use the I/O bus burst mode. The burst mode is an efficient way for transferring sequential address locations without having to send the address across for each word transferred. In this mode, CPU DRAM controller 410 uses a built-in DMA channel to transfer a burst of data to graphics board 80. I/O bus 50 can support the burst mode of operation up to 40 megabytes per second in a preferred embodiment of the present invention. In the burst mode, a single address is followed by a burst of data. In a preferred embodiment of the present invention, during a DMA transfer to graphics board 80 in the burst mode, the rate of transfer is 10 million pixels per second and one data word is transferred every 100 nanoseconds.

In a preferred embodiment of the present invention, the digital computer is configured to support transfers to and from VME expansion board 210 in the burst mode.

For DMA burst mode operations, DMA DRAM controller 440 is initially loaded with a starting address. DMA controller 440 then generates sequential addresses for the data to be transferred during the burst mode operation. Likewise, during VME burst mode operations, VME DRAM controller 430 is initially loaded with a beginning address, VME DRAM controller 430 then generates subsequent addresses for the data to be transferred during burst mode operation.

Bus timer 630 of FIG. 3, together with I/O bus arbiter 600 and CPU arbiter 610, comprise a bus monitor mechanism that is used to guarantee a minimum bus bandwidth allocation or execution allocation to CPU 40 and I/O requests, such as those from Ethernet controller 120 and SCSI disk controller 130, in the presence of DMA or VME burst transfers. Any time a DMA or VME burst mode operation starts, the bus monitor mechanism keeps track of how long DMA or VME has the I/O bus and keeps the DMA or VME off the bus for certain amount of time to allow CPU 40 or I/O devices, such as Ethernet controller 120, to access I/O bus 50 and DRAM array 60.

Bus timer 630 of FIG. 3 controls the burst length and the delay time. The burst length can be set by software within a certain range of lengths. The burst length sets an upper maximum on the amount of time that a DMA or VME burst mode operation can occur. The delay time is the time that the CPU is guaranteed to own the I/O bus 50. During the delay time, CPU 40 is guaranteed to own I/O bus for the delay period of time, whether CPU 40 needs the bus or not. During the delay time, CPU 40 cannot be preempted by DMA, VME, or I/O operations. Delay counter 632 of bus timer 630 sets a minimum bus grant period to CPU 40 in 100 nanoseconds increments. The delay counter thus sets the delay period. The delay counter 632 can be set by software within a range.

Burst counter 634 sets a maximum burst length in 100 nanoseconds increments. At the end of the burst interval, DMA and VME bursts are terminated. The burst counter can be set by software in order to set the maximum burst length.

Bus timer 630 is designed to allow dynamic switching of I/O bus 50 loading depending on whether or not CPU 40 needs quick real-time response. The nominal setting will be 20.6 microsecond bursts and 2 microsecond delay. During an interrupt service routine, the first task is to reload bus timer 630 to increase the time allocated to CPU 40 and to decrease the burst length. Thereafter, the routine can determine whether the interrupt to be serviced can tolerate less bus bandwidth or not, and either leave the bus timer 630 alone, or set it back accordingly.

The burst length can be set between 0 microseconds and 25.6 microseconds. The delay length can be set between 0 microseconds and 25.6 microseconds. Thus, the burst and delay lengths can be set in a manner analogous to the setting of 636 and 638 on a dial.

Bus arbitration by arbiter 470 is also governed by priority rules. Refresh operations have the highest priority. Input/output operations have the second highest priority. VME operations have the third highest priority. DMA operations have the fourth highest priority. Finally, CPU 40 operations have the fifth highest priority. Again, refresh operations can occur concurrently with CPU operations that only access I/O bus 50 and do not access memory 60. In the case of VME burst requests that are simultaneous with graphics DMA burst requests, the VME requests get priority by arbiter 470. This means that as long as there are any pending transfers on VME, the graphics DMA is held off the I/O bus. The bus timer 630 applies globally—that is, bus timer 630 ensures that the total totality of VME and graphics DMA channels get only a certain proportion of the I/O bus 50 bandwidth. This implies that the higher priority channels slow down the lower prior channels when the higher priority channels become active.

If CPU, DMA, and Ethernet requests arrive at precisely the same time, the Ethernet request is granted first. The DMA request is then granted. Then the CPU request is granted.

In a preferred embodiment of the present invention, the arbitration scheme allows refresh to occur during VME access from CPU 40. This has the benefit of ensuring the integrity of memory during boot operations.

As shown in FIG. 4, bus timer 630 allows a VME or a DMA transfer for burst length period 660. The burst period 660 ends at the earlier of: (1) the maximum burst length period stored in burst counter 634 of bus timer 630, or (2) whenever the DMA operation ends, if earlier than the maximum burst length period set in burst length counter 634. At the end of burst period 660, arbiter 470 signals either the DMA DRAM controller 440 or the VME DRAM controller 430 whichever is controlling the transfer during burst period 660, to get off the I/O bus, I/O bus 50, or in other words to "back-off" the I/O bus 50. FIG. 4 illustrates bus arbitration without the presence of an I/O request for the I/O bus or memory. Delay period 662 follows burst period 660. During delay 662, CPU 40 is permitted to access I/O bus 50. Again, CPU 40 is guaranteed to own I/O bus 50 for the delay period 662, whether CPU 40 needs the I/O bus 50 or not. Thus, delay period 662 is a minimum period that CPU 40 is guaranteed I/O bus 50. At the end of delay period 662, another DMA or VME burst mode operation can then occur for burst period 664, which could be the same length of burst period 660, depending the DMA or VME transfer ends before the burst length set in burst counter 634. Burst period 664 is then followed by another delay period, and so forth.

FIG. 5 illustrates bus arbitration in the presence of I/O requests to use the I/O bus. Again, DMA or VME burst mode operations can last the length of the burst period, as described with respect to FIG. 4. If, however, there is a request for an I/O operation from Ethernet controller 120, then arbiter 470 allows that I/O operation to occur immediately following burst period 670. I/O period 672 is the period arbiter 470 allows the I/O operation to occur. I/O period 672 lasts for as long as it takes for the I/O operation to end. The I/O period 672 is thus of variable length.

The maximum length of time that Ethernet controller 120 can tolerate being off I/O bus 50 determines the maximum burst length and delay length periods.

There is no maximum period for I/O period 672. The reason for this is that I/O devices generally will not stay on the bus for long periods of time.

After I/O period 672 ends, then the CPU is guaranteed the I/O bus for the delay period 674. Again, CPU 40 is guaranteed access to the I/O bus 50 during delay period 674, whether or not CPU 40 wishes to access I/O bus 50 during said delay period 674.

Following delay period 674, another VME or DMA burst period can occur. Following that DMA or VME burst period another I/O period can occur and another delay period can then occur and so forth.

During the delay period 674, I/O operation requests are suppressed by arbiter 470.

FIG. 6 illustrates the circuitry governing VME bus arbitration. When CPU 40 wants to read or write to VME bus 200, CPU uses the VME external master interface 700. VME bus 200 arbitration is governed by I/O bus arbiter 600, VME bus arbiter 720 and VME external master 700. VME external master 700 is located on VME expansion board 210.

VME bus 200 arbitration is governed by the following rules. CPU 40 has to be granted both I/O bus 50 and VME bus 200 for CPU 40 to get VME bus 200. VME, however, needs to get I/O bus and VME bus 200 in order to access memory 60. To avoid deadlocks, CPU 40 always acquires VME bus 200 before acquiring I/O bus 50. VME external master 700 always acquires VME bus 200 before acquiring I/O bus 50. In the case that CPU 40 owns I/O bus 50 (which is the default condition) and VME external master 700 owns VME bus 200, then CPU 40 releases I/O bus 50 until CPU 40 gets VME bus 200. During this time, presumably VME external master 700 acquires I/O bus 50 and completes its memory access operation and then releases both I/O bus 50 and VME bus 200.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a computer that includes a dynamic random access memory (DRAM), a first clock for supplying a first clock signal at a first clock rate, a second clock for supplying a second clock signal at a second clock rate different from the first clock rate, a first bus for transferring a first address at a rate synchronized with the first clock rate, and a second bus for transferring a second address at a rate synchronized with the second clock rate, a DRAM control apparatus comprising:

a first multiplexer coupled to the DRAM;
a second multiplexer coupled to the DRAM;
a first controller, coupled to the first bus and to the first and second multiplexers, clocked by the first clock, and synchronized with the first clock rate for controlling the DRAM, for supplying the DRAM via the first multiplexer with the first address from the first bus synchronized with the first clock rate, for supplying the DRAM via the second multiplexer with a first strobe signal synchronized with the first clock rate, and for synchronizing the DRAM, the first multiplexer, and the second multiplexer with the first clock rate;
a second controller, coupled to the second bus and to the first and second multiplexers, clocked by the second clock, and synchronized with the second clock rate for controlling the DRAM, for supplying the DRAM via the first multiplexer with the second address from the second bus synchronized with the second clock rate, for supplying the DRAM via the second multiplexer with a second strobe signal synchronized with the second clock rate, and for synchronizing the DRAM, the first multiplexer, and the second multiplexer with the second clock rate;

an arbiter coupled to the first and second controllers for selectively engaging the respective first controller and the second controller based on a predetermined priority and timing scheme, wherein the first and second controllers are not engaged simultaneously, wherein when the first controller is engaged, the first controller (1) controls the DRAM, (2) supplies the DRAM via the first multiplexer with the first address from the first bus synchronized with the first clock rate, (3) supplies the DRAM via the second multiplexer with the first strobe signal synchronized with the first clock rate, and (4) synchronizes the DRAM, the first multiplexer, and the second multiplexer with the first clock rate, wherein when the second controller is engaged, the second controller (1) controls the DRAM, (2) supplies the DRAM via the first multiplexer with the second address from the second bus synchronized with the second clock rate, (3) supplies the DRAM via the second multiplexer with the second strobe signal synchronized with the second clock rate, and (4) synchronizes the DRAM, the first multiplexer, and the second multiplexer with the second clock rate.

2. The DRAM control apparatus of claim 1, wherein;
the first bus is a local bus for a central processing unit of the computer;
the first clock rate is a clock of the central processing unit;
the second bus is coupled to input/output means of the computer; and
the second clock rate is an input/output clock rate.

3. The DRAM control apparatus of claim 2, wherein the input/output means comprises:
an interface to a cable coupled to another computer;
an interface to a disc drive;
an interface to a printer; and
an interface to audio circuitry.

4. The DRAM control apparatus of claim 1, further comprising a third controller coupled to an expansion board, to the arbiter, and to the first and second multiplexers, clocked by the second clock, and synchronized with the second clock rate for controlling the DRAM, for supplying the DRAM via the first multiplexer with a third address from the expansion board synchronized with the second clock rate, for supplying the DRAM via the second multiplexer with a third strobe signal synchronized with the second clock rate, and for synchronizing the DRAM, the first multiplexer, and the second multiplexer with the second clock rate, wherein the arbiter selectively engages the respective first, second, and third controllers based on a predetermined priority and timing scheme, wherein the first, second, and third controllers are not engaged simultaneously, wherein when the third controller is engaged, the third controller (1) controls the DRAM, (2) supplies the DRAM via the first multiplexer with the third address from the expansion board synchronized with the second clock rate, (3) supplies the DRAM via the second multiplexer with the third strobe signal synchronized with the second clock rate, and (4) synchronizes the DRAM, the first multiplexer, and the second multiplexer with the second clock rate.

5. The DRAM control apparatus of claim 4, further comprising a fourth controller coupled to a graphics board to the arbiter, and to the first and second multiplexers, clocked by the second clock, and synchronized with the second clock rate for controlling the DRAM for supplying the DRAM via the first multiplexer with a fourth address from the graphics board synchronized with the second clock rate, for supplying the DRAM via the second multiplexer with a fourth strobe signal synchronized with the second clock rate, and for synchronizing the DRAM, the first multiplexer, and the second multiplexer with the second clock rate, wherein the arbiter selectively engages the respective first, second, third, and fourth controllers based on a predetermined priority and timing scheme, wherein the first, second, third, and fourth controllers are not engaged simultaneously, wherein when the fourth controller is engaged, the fourth controller (1) controls the DRAM, (2) supplies the DRAM via the first multiplexer with the fourth address from the graphics board synchronized with the second clock rate, (3) supplies the DRAM via the second multiplexer with the fourth strobe signal synchronized with the second clock rate, and (4) synchronizes the DRAM, the first multiplexer, and the second multiplexer with the second clock rate.

6. The DRAM control apparatus of claim 5, further comprising refresh circuitry coupled to the arbiter and to the first and second multiplexers for refreshing the DRAM, for supplying the DRAM via the first multiplexer with a refresh address, and for supplying the DRAM via the second multiplexer with a fifth strobe signal, wherein the arbiter selectively engages the respective circuitry and the first, second, third, and fourth controllers based on a predetermined priority and timing scheme, wherein when the refresh circuitry is engaged, the refresh circuitry (1) refreshes the DRAM, (2) supplies the DRAM via the first multiplexer with the refresh address, and (3) supplies the DRAM via the second multiplexer with the fifth strobe signal.

7. A digital computer comprising:
a central processing unit;
a dynamic random access memory (DRAM);
a first clock for supplying a first clock signal at a first rate;
a second clock for supplying a second clock signal at a second clock rate different from the first clock rate;
a first bus for transferring a first address at a rate synchronized with the first clock rate;
a second bus for transferring a second address at a rate synchronized with the second clock rate;
a first multiplexer coupled to the DRAM;
a second multiplexer coupled to the DRAM;
a first controller coupled to the first bus, to the first multiplexer, and to the second multiplexer, clocked by the first clock, and synchronized with the first clock rate for controlling the DRAM, for supplying the DRAM via the first multiplexer with the first address from the first bus synchronized with the first clock rate, for supplying the DRAM via the second multiplexer with a first strobe signal synchronized with the first clock rate, and for synchronizing the DRAM, the first multiplexer, and the second multiplexer with the first clock rate,
a second controller coupled to the second bus, to the first multiplexer, and to the second multiplexer, clocked by the second clock, and synchronized with the second clock rate for controlling the DRAM, for supplying the DRAM via the first multiplexer with the second address from the second bus synchronized with the second clock rate, for supplying the DRAM via the second multiplexer with a second strobe signal synchronized with the second clock rate, and for synchronizing the DRAM, the first multiplexer, and the second multiplexer with the second clock rate;

an arbiter coupled to the first and second controller for selectively engaging the respective first controller and the second controller based upon a predetermined priority and timing scheme, wherein the first and second controllers are not engaged simultaneously, wherein when the first controller is engaged, the first controller (1) controls the DRAM, (2) supplies the DRAM via the first multiplexer with the first address from the first bus synchronized with the first clock rate, (3) supplies the DRAM via the second multiplexer with the first strobe signal synchronized with the first clock rate, (4) synchronizes the DRAM, the first multiplexer, and the second multiplexer with the first clock rate, wherein when the second controller is engaged, the second controller (1) controls the DRAM, (2) supplies the DRAM via the first multiplexer with the second address from the second bus synchronized with the second clock rate, (3) supplies the DRAM via the second multiplexer with the second strobe signal synchronized with the second clock rate, and (4) synchronizes the DRAM, the first multiplexer, and the second multiplexer with the second clock rate.

* * * * *